Figure 1:
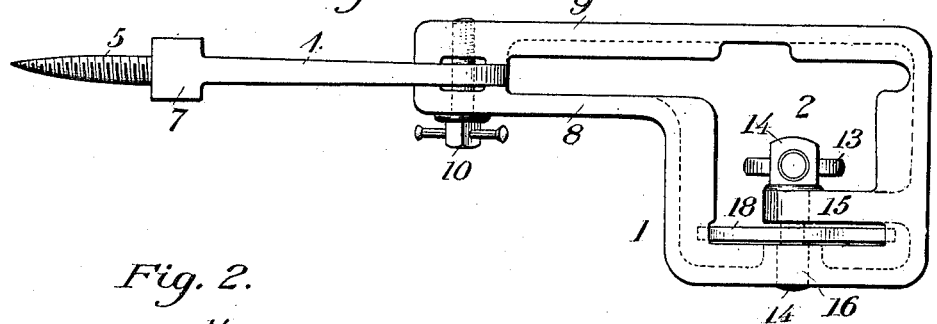
Figure 2:
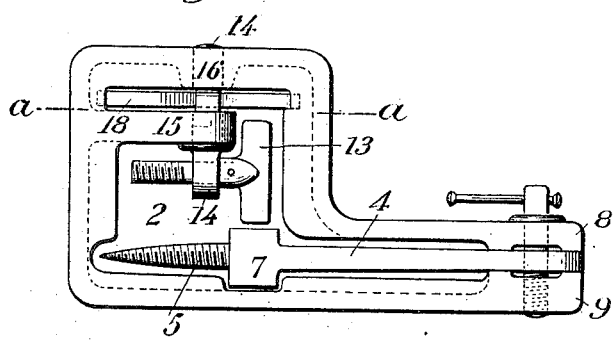
Figure 3:
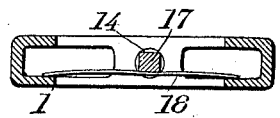
Figure 4:
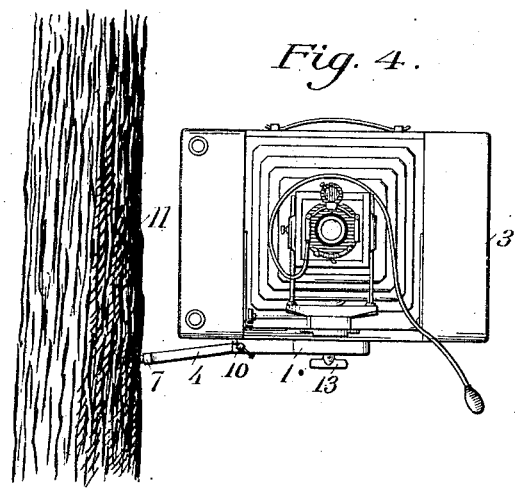
Figure 5:
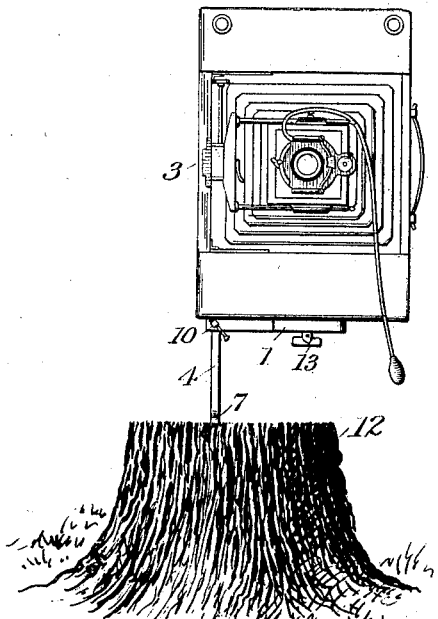

No. 704,666.  
J. R. STEPHENS.  
CAMERA SUPPORT.  
(Application filed Nov. 15, 1901.)  
Patented July 15, 1902.

(No Model.)

Witnesses:  
R A Balderson  
Alex Scott

Inventor:  
John R. Stephens  
by J. Richards & Co.,  
attys.

UNITED STATES PATENT OFFICE.

JOHN R. STEPHENS, OF PORTLAND, OREGON.

CAMERA-SUPPORT.

SPECIFICATION forming part of Letters Patent No. 704,666, dated July 15, 1902.

Application filed November 15, 1901. Serial No. 82,487. (No model.)

*To all whom it may concern:*

Be it known that I, JOHN R. STEPHENS, a citizen of the United States, residing at Portland, county of Multnomah and State of Oregon, have invented certain new and useful Improvements in Camera-Supports; and I hereby declare the following to be a full, clear, and exact description of the same, reference being had to the accompanying drawings, forming a part of this specification.

My invention relates to a device for mounting photograph-cameras or other like instruments that require temporary support and to certain useful improvements therein.

My improvements consist of a frame having pivoted members for supporting and adjusting cameras and like instruments, the whole being capable of being folded in compact form when not in use, but when extended presenting a pointed stem that can be screwed or forced into a tree, post, or any suitable structure, pivoted thereto a seat for a camera, compass, field-glass, or other instrument, this seat having devices to attach the instrument in use thereto, said devices being capable of folding into small space when out of use, so the whole can be conveniently carried in the pocket of an operator or within an instrument-case.

The object of my invention is to provide instead of the usual tripod a simple and steady support for cameras or like instruments, so that any desired adjustment of the instrument may be obtained by a combination of three rotations—namely, rotation of the whole device about a screw or pointed stem as an axis, rotation of the seat for the instrument with respect to the support, rotation of the camera or other instrument on its seat—the whole forming a device easily constructed and operated, as illustrated in the drawings herewith and that form a part of this specification.

Referring to the drawings, Figure I is a plan view of one of my improved supports mounted and extended ready to receive a camera or other instrument. Fig. II is a similar plan view of the opposite side of the same device as it is folded when out of use. Fig. III is a section on the line *a a* in Fig. II. Fig. IV shows the device attached to the trunk of a tree supporting a photographic camera. Fig. V shows the device as it appears when attached to a horizontal surface, such as a stump, and a camera supported thereby.

In setting instruments of a visual kind, especially for photographing objects, a common impediment is a tripod to provide a stable supporting device capable of adjustment and sufficiently compact to be conveniently carried and set up. Trees, logs, stumps, or artificial structures of wood are commonly available and furnish stable support by means of the device now to be described.

The main frame 1 is made of metal, preferably of aluminium, for lightness, and for the same object is made of a section, as shown in Fig. III and indicated by dotted lines in Figs. I and II, the inturned flanges around the perforation 2 forming a seat for an instrument such as a camera 3, which is selected for illustration.

The member 4 is provided with a tapering point 5, preferably having screw-threads and adapted for entering wood and may be turned by a wrench applied on the squared portion 7, but more commonly by means of the main frame 1, which for that purpose can be set at a right angle, if required, as shown in Fig. V. This member 4 is clamped between the extensions 8 and 9 of the main frame and pivoted on a screw 10, that clamps the whole firmly after the plane of the main frame 1 is adjusted to the required angle, as shown in Fig. IV, adjustment in the other plane or in the line of sight being made by turning the point 5 in the wood 11 or 12.

The camera 3 is held by means of a screw 13, that passes through a revoluble stem 14, provided with bearings 15 and 16, and between these is made of a squared section 17, as shown in Fig. III, on which presses a flat spring 18, so this stem 14 will remain fixed in three positions, permitting either side of the main frame 1 to be turned upward or the screw 13 to be folded parallel thereto, as shown in Fig. II. The camera is revolved about the screw 13 so as to face the desired way and is then firmly clamped by said screw 13 to the frame 1.

When folded, as shown in Fig. II, which shows the device of full size for small instruments, it will be seen that the whole occupies in this plane a space of two by four inches, and in thickness as shown in Fig. III, and is thus adapted for carrying in a pocket-case.

Having thus described the nature and objects of my invention, I claim as new and desire to secure by Letters Patent—

1. In a camera-support, a main frame, a folding member provided with a penetrative point, means for clamping and releasing said folding member, and means for securing, clamping and releasing a camera or like instrument to said frame, substantially as specified.

2. In a camera-support, a main frame, provided with elastic extensions 8, 9, a clamping-screw therethrough, a folding member provided with a penetrative point secured between said elastic extensions, and a clamping-screw for securing a camera or like instrument to said frame, substantially as specified.

3. In a camera-support, a main frame having its periphery of trough-like form in section, to reduce weight while retaining strength, the inturned edges thereby forming flat bearing-surfaces on both sides for supporting the instrument thereon, and provided with a folding member, having a penetrative point, with means for clamping and releasing said folding member, substantially as specified.

4. In a camera-support, a main frame having its periphery made trough-like in section and provided with elastic extensions, a folding member adjustably secured between said extensions, said folding member provided with means for securing it to a penetrable substance, such as wood, a revoluble stem 14 within said frame, and a clamping-screw for securing a camera or like instrument to the frame, held in said revoluble stem, whereby it is capable of being folded within the thickness of the frame when not in use, substantially as specified.

5. In a camera-support, a main frame, a revoluble stem fitted within said frame, having a squared section thereon, a clamping-screw held in the revoluble stem, for securing a camera or like instrument to the frame, and a spring pressing on the squared section of the revoluble stem, whereby the said clamping-screw is retained either in the erect position when in use, or in the folded position when not in use, substantially as specified.

In testimony whereof I have signed my name to this specification in the presence of two subscribing witnesses.

JOHN R. STEPHENS.

Witnesses:
JOHN A. McDONALD,
ELWOOD G. GODMAN.